(12) United States Patent
Ehrlich

(10) Patent No.: US 7,206,157 B2
(45) Date of Patent: Apr. 17, 2007

(54) SYSTEMS AND METHODS FOR TWO-STEP SELF-SERVOWRITING USING OPTIMAL INTERMEDIATE PATTERN

(75) Inventor: Richard M. Ehrlich, Saratoga, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 173 days.

(21) Appl. No.: 11/003,605

(22) Filed: Dec. 3, 2004

(65) Prior Publication Data

US 2006/0007584 A1 Jan. 12, 2006

Related U.S. Application Data

(60) Provisional application No. 60/586,195, filed on Jul. 8, 2004.

(51) Int. Cl.
*G11B 21/02* (2006.01)

(52) U.S. Cl. .................................................. 360/75

(58) Field of Classification Search .................. None
See application file for complete search history.

(56) References Cited

U.S. PATENT DOCUMENTS

| 5,612,833 | A * | 3/1997 | Yarmchuk et al. | 360/75 |
| 6,091,564 | A * | 7/2000 | Codilian et al. | 360/75 |
| 6,304,407 | B1 * | 10/2001 | Baker et al. | 360/75 |
| 6,519,107 | B1 * | 2/2003 | Ehrlich et al. | 360/75 |
| 2006/0007583 | A1 * | 1/2006 | Ehrlich | 360/75 |

* cited by examiner

*Primary Examiner*—Andrew L. Sniezek
(74) *Attorney, Agent, or Firm*—Fliesler Meyer LLP

(57) ABSTRACT

A two-step self-servowriting process first writes an intermediate pattern based on a reference pattern, and then writes a final pattern based on the intermediate pattern, wherein the reference pattern can be a printed media or a spiral pattern. Such an approach can be utilized to reduce the noise/runout, eliminate timing eccentricity, and increase the sample rate of the final pattern. In addition, a disk drive containing multiple rotatable disks can perform two-step self servowriting using either a per-cylinder process to further improve written-in runout. In such a process, intermediate servo patterns can be written via each head in the drive, and the final servo patterns can be written and/or re-written via each head at one time based on an optimal intermediate pattern. This description is not intended to be a complete description of, or limit the scope of, the invention. Other features, aspects, and objects of the invention can be obtained from a review of the specification, the figures, and the claims.

21 Claims, 12 Drawing Sheets

Preamble, SAM and some digital information  Zig  Zag Timing

SYSTEMS AND METHODS FOR TWO-STEP SELF-SERVOWRITING USING OPTIMAL INTERMEDIATE PATTERN

CLAIM OF PRIORITY

This application claims priority from the following application, which is hereby incorporated by reference in its entirety:

U.S. Provisional Patent Application No. 60/586,195, entitled SYSTEMS AND METHODS FOR TWO-STEP SELF SERVOWRITING, by Richard M. Ehrlich et al, filed Jul. 8, 2004.

CROSS-REFERENCE TO RELATED APPLICATION

This application is related to the following co-pending application which is hereby incorporated by reference in its entirety:

U.S. patent application Ser, No. 11/003,036, now U.S. Pat. No. 7,099,107 entitled SYSTEMS AND METHODS FOR TWO-STEP SELF SERVO WRITING USING PER-HEAD FINAL PATTERN WRITING by Richard M. Ebrlich, filed concurrently.

INCORPORATION BY REFERENCE

This application is related to the following patent which is hereby incorporated by reference in its entirety:

U.S. Pat. No. 6,738,205, SELF-WRITING OF SERVO PATTERNS IN DISK DRIVES, Inventors: Patrick Moran et al., filed on Jul. 8, 2001.

FIELD OF THE INVENTION

The present invention relates to the writing of position information to rotatable media.

BACKGROUND

Advances in data storage technology have provided for ever-increasing storage capability in devices such as DVD-ROMs, optical drives, and disk drives. In hard disk drives, for example, the width of a written data track has decreased due in part to advances in read/write head technology, as well as in reading, writing, and positioning technologies. More narrow data tracks result in higher density drives, which is good for the consumer but creates new challenges for drive manufacturers. As the density of the data increases, the tolerance for error in the position of a drive component such as a read/write head decreases. As the position of such a head relative to a data track becomes more important, so too does the placement of information, such as servo data, that is used to determine the position of a head relative to a data track.

DETAILED DESCRIPTION

Figure 1:
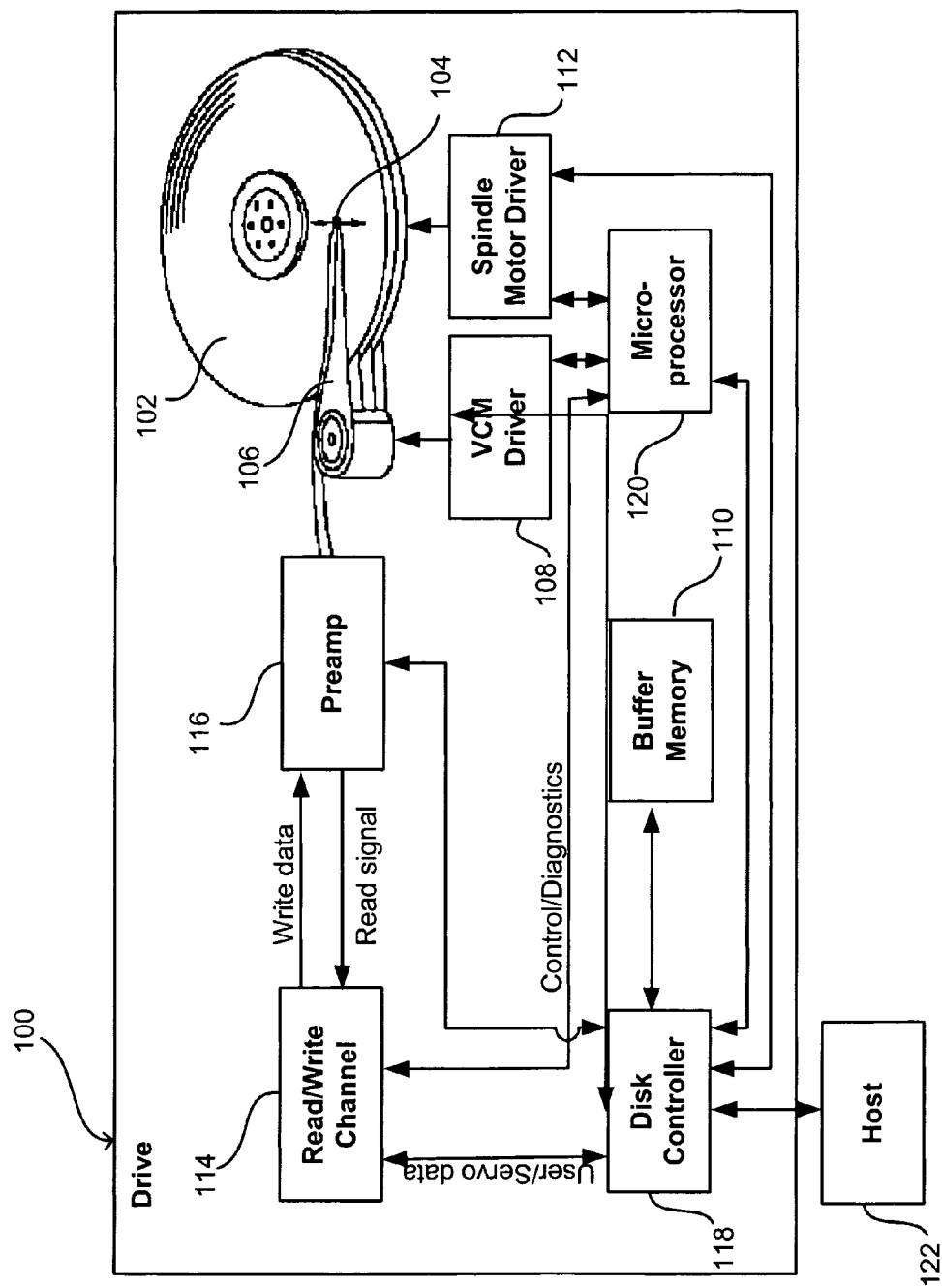
FIG. 1 is a diagram showing components of an exemplary drive system that can be used in accordance with various embodiments of the present invention.

Systems and methods in accordance with various embodiments of the present invention can be used when servowriting, or self-servowriting, a rotatable storage medium in a data storage device, such as a hard disk drive. For example, a typical disk drive 100, as shown in FIG. 1, includes at least one magnetic disk 102 capable of storing information on at least one of the surfaces of the disk(s). A closed-loop servo system can be used to move an actuator arm 106 and data head 104 over the surface of the disk(s), such that information can be written to, and read from, the surface of the disk(s). The closed-loop servo system can contain, for example, a voice coil motor driver 108 to drive current through a voice coil motor (not shown) in order to drive the actuator arm, a spindle motor driver 112 to drive current through a spindle motor (not shown) in order to rotate the disk(s), a microprocessor 120 to control the motors, and a disk controller 118 to transfer information between the microprocessor, buffer memory 110, read channel 114, and a host 122. A host can be any device, apparatus, or system capable of utilizing the data storage device, such as a personal computer or Web server or consumer electronics device. The drive can contain at least one processor, or microprocessor 120, that can process information for the disk controller 118, read/write channel 114, VCM driver 108, or spindle driver 112. The microprocessor can also include a servo controller, which can exist as an algorithm resident in the microprocessor 120. The disk controller 118, which can store information in buffer memory 110 resident in the drive, can also provide user data to a read/write channel 114, which can send data signals to a current amplifier or preamp 116 to be written to the disk(s) 102, and can send servo and/or user data signals back to the disk controller 118.

Figure 2:
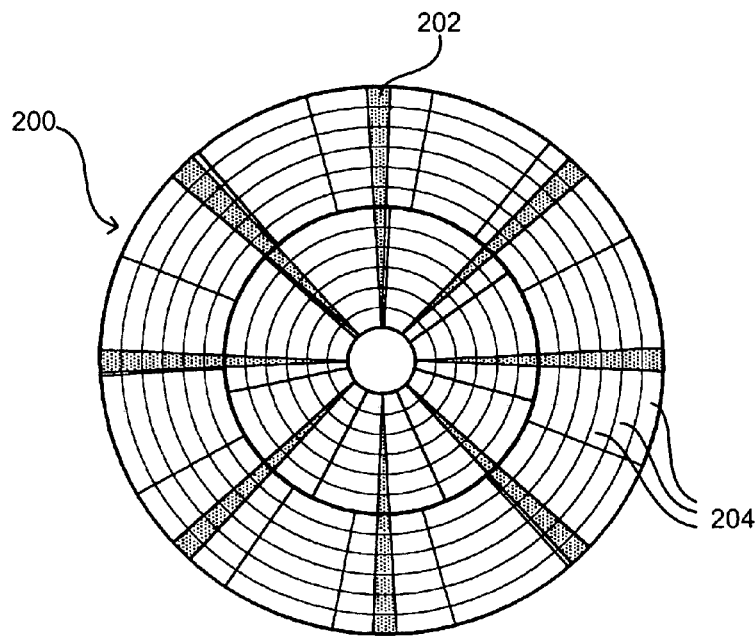
FIG. 2 is a diagram showing an example of a data and servo format for a disk in the drive of FIG. 1.

The information stored on such disk(s) can be written in concentric tracks, extending from near the inner diameter to near the outer diameter of the disk 200, as shown in the example disk of FIG. 2. In an embedded servo-type system, servo information can be written in servo wedges 202, and can be recorded on tracks 204 that can also contain data. In a system where the actuator arm rotates about a pivot point such as a bearing, the servo wedges may not extend linearly from the inner diameter (ID) of the disk(s) to the outer diameter (OD), but may be curved slightly in order to adjust for the trajectory of the head as it sweeps across the disk(s).

The servo information often includes bursts of transitions called "servo bursts." The servo information can be positioned regularly about each track, such that when a data head reads the servo information, a relative position of the head can be determined that can be used by a servo processor to adjust the position of the head relative to the track. For each servo wedge, this relative position can be determined in one example as a function of the target location, a track number read from the servo wedge, and the amplitudes or phases of the bursts, or a subset of those bursts. A measure of the position of a head or element, such as a read/write head or element, relative to the center of a target track, will be referred to herein as a position-error signal (PES).

Figure 3:
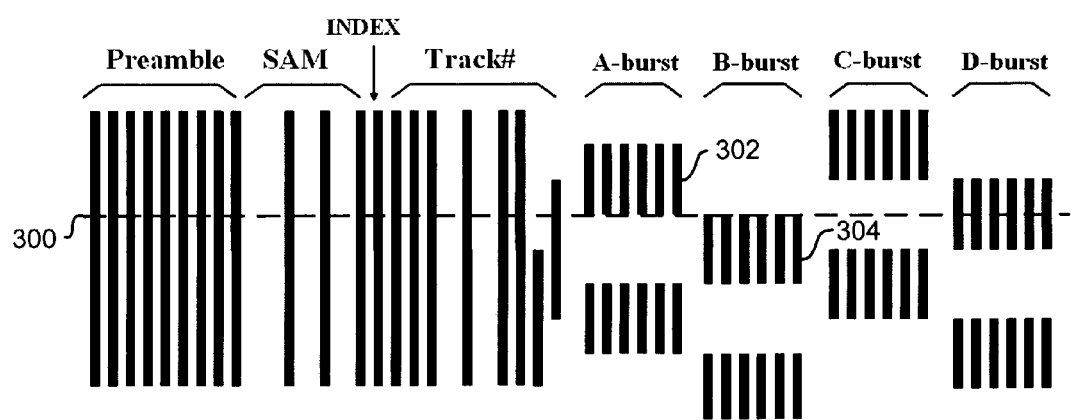
FIG. 3 is a diagram showing servo information that can be written to the tracks shown in FIG. 2.

For example, a centerline 300 for a given data track can be "defined" relative to a series of bursts, burst edges, or burst boundaries, such as a burst boundary defined by the lower edge of A-burst 302 and the upper edge of B-burst 304 in FIG. 3. The centerline can also be defined by, or offset relative to, any function or combination of bursts or burst patterns. As a non-limiting example, a centerline defined by four bursts can be referred to as "4-burst-centerline" as described for example, in U.S. Pat. No. 5,381,281 entitled "Disk Drive System Using Multiple Embedded Quadrature Servo Fields", by Louis J. Shrinkle, et al, filed Jun. 24, 1993. The definition of a track centerline can include, for example, a location at which the PES value is a maximum, a minimum, or a fraction or percentage thereof. Any location relative to a function of the bursts can be selected to define track position. For example, if a read head evenly straddles an A-burst and a B-burst, or portions thereof, then servo demodulation circuitry in communication with the head can produce equal amplitude measurements for the two bursts, as the portion of the signal coming from the A-burst above the centerline is approximately equal in amplitude to the portion coming from the B-burst below the centerline. The resulting computed PES can be zero if the radial location defined by the A-burst/B-burst (A/B) combination, or A/B boundary, is the center of a data track, or a track centerline. In such an embodiment, the radial location at which the PES value is zero can be referred to as a null-point. Null-points can be used in each servo wedge to define a relative position of a track. If the head is too far towards the outer diameter of the disk(s), or above the centerline in FIG. 3, then there will be a greater contribution from the A-burst that results in a more "negative" PES. Using the negative PES, the servo controller could direct the voice coil motor to move the head toward the inner diameter of the disk(s) and closer to its desired position relative to the centerline. This can be done for each set of burst edges defining the shape of that track about the disk(s).

The PES scheme described above is one of many possible schemes for combining the track number read from a servo wedge and the phases or amplitudes of the servo bursts. Many other schemes are possible that can benefit from embodiments in accordance with the present invention A problem that exists in the reading and writing of servo information such as servo patterns involves the misplacement, or offset, of a read/write head with respect to the ideal and/or actual position of a track. It is impossible to perfectly position a head with respect to a track for each rotation of disk(s), as there is almost always a noticeable offset between the desired position and the actual position of the head with respect to the disk(s). This can cause problems when writing servo patterns, as each portion of the pattern can be slightly misplaced. This can lead to what is referred to as "written-in runout." Written-in runout can be thought of as the offset between the actual centerline, or desired radial center, of a track and the centerline that would be determined by a head reading the written servo pattern. Written-in runout can lead to servo performance problems, wasted space on disk(s) and, in a worst case, unrecoverable or irreparably damaged data.

Additional servowriting steps can be used when writing servo information. The use of additional servowriting steps for the writing and/or trimming of servo burst patterns, for example, can provide for a low written-in runout in a servo pattern, but at the cost of some time-penalties in the servowriting and/or self-servowriting operations. For the discussion in this application, a "servowriting step" involves either:

a) writing digital information, writing one complete burst, and trimming another, or
b) writing one complete burst, and trimming another.

And a "pass" commonly used in the industry involves one or more of:

a) writing digital information and a burst;
b) writing just a burst;
c) writing digital information and trimming a burst; and
d) trimming a burst.

For either a step or a pass, an action occurs for all wedges around the disk. In contrast, a "revolution" involves doing at least one of the actions involved in a pass, but possibly only for a subset of all the wedges around the disk.

FIGS. 4(a)–4(f) depict the progression of several servowriting steps of an exemplary servowriting process. The pattern shown in these figures is commonly referred to in the industry as a 3-pass-per-track, trimmed-burst pattern, for reasons described below. Using the nomenclature of this document, one could refer to the pattern as a "3-servowriting-step-per-track, trimmed-burst" pattern. Each figure depicts a small portion of the surface of disk(s). This portion can contain several servo tracks, extending radially on the disk(s) and vertically in the figures, and can cover the space of a single servo wedge, circumferentially on the disk(s) and horizontally in the figures. A typical drive can have tens of thousands of servo tracks, and over one hundred wedges per revolution. In the figures, the black areas indicate portions of the surface of the disk(s) that have been magnetized in one direction. The white areas have been magnetized in another direction, typically in a direction opposite to that of the patterned areas. For a drive that uses longitudinal recording, the two directions can be in the positive and negative circumferential directions. For a drive that uses vertical recording technology (also sometimes referred to in the industry as "perpendicular recording"), the two directions can be perpendicular to the recording surface, such as would be "in" and "out" of the page for the illustrations of FIGS. 4(a)–(f). These simplified figures do not show effects of side writing of the write element, which can produce non-longitudinal magnetization and erase bands. Such effects are not of primary importance to the discussion herein.

Figure 4A:
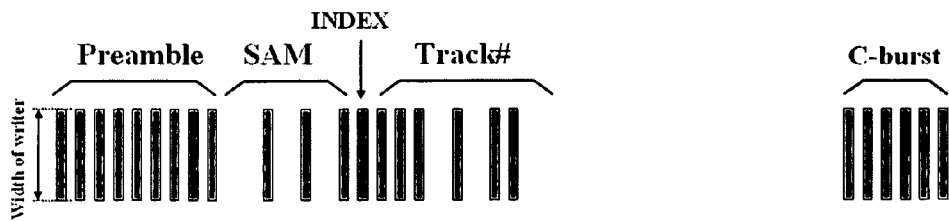
FIGS. 4(a)–(f) are diagrams of a servo-burst pattern being written over a progression of servowriting steps.

In FIG. 4(a), the result of a single servowriting step is shown. From that step, the servowriting head (passing from left to right in the figure) has written an exemplary servo pattern containing a preamble, followed by a servo-address mark (SAM), followed by an INDEX-bit, and then a track number, as is known in the art. Other information can be written to the servo pattern in addition to, or in place of, the information shown in FIG. 4(a). An INDEX-bit, for example, is one piece of information that can be used to give the servo an indication of which wedge is wedge-number zero, useful for determining circumferential position. The track number, which can be a graycoded track-number, can later be used by the servo to determine the coarse radial position of the read/write (R/W) head (note that the bits representing the track number shown here are for illustration purpose only, a typical drive may have up to 18 or more track number bits). Following the track number, the head writes one of four servo bursts, in this case what will be referred to as a C-burst, which can later be used by a servo to determine the fine (fractional track) radial position of a R/W head. The number of servo bursts used can vary with servo pattern. The burst that is written can be, for example, the one that is in-line with the digital information. The width of the written track can be determined by the magnetic write-width of the write element of the servowriting head.

Figure 4B:
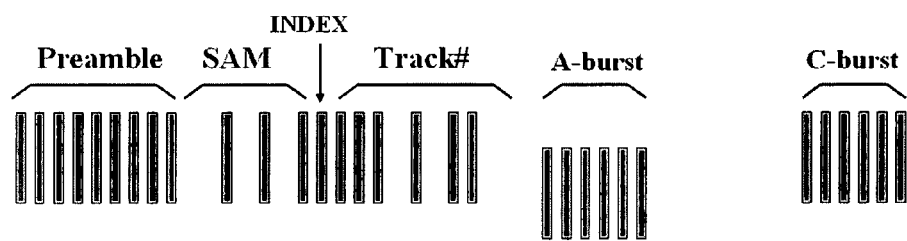

FIG. 4(b) shows the result of a second servowriting step of the servowriting head. All that has been added in the second step is an additional burst, in this case referred to as an A-burst. The A-burst is displaced longitudinally from both the digital information and the C-burst, to prevent any overlap in the longitudinal direction. The A-burst is also displaced by approximately one-half of a servo-track in the radial direction.

Figure 4C:
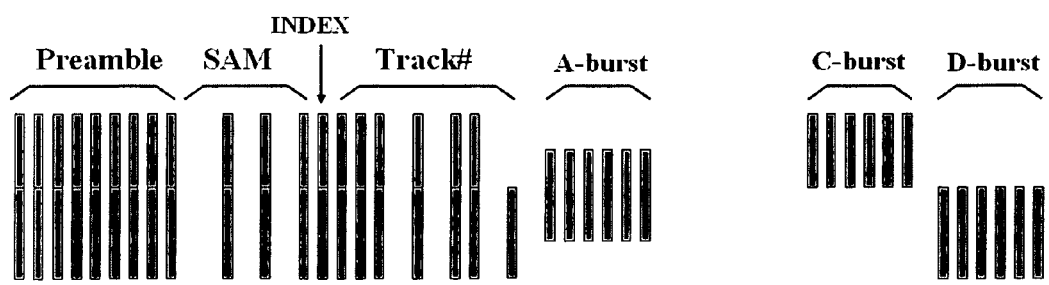

FIG. 4(c) shows the magnetization pattern after three servowriting steps of the servowriting head. The new portion of the pattern has been written with the servowriting head displaced another half servo track radially, for a total displacement of one servo-track, or two-thirds of a data-track, from the position of the head during the first servowriting step. New digital information has been written, including the same preamble, SAM, and INDEX-bit, as well as a new track number. A D-burst was added during the third servowriting step, and the C-burst was "trimmed." The C-burst was trimmed by "erasing" the portion of the C-burst under the servowriting head as the head passed over the burst on the third servowriting step. As long as the servowriting head is at least two-thirds of a data-track in radial extent, the digital information will extend across the entire radial extent of the servo-written pattern. This trimming of the C-burst and writing of the D-burst created a common edge position or "boundary" between the two bursts.

Figure 4D:
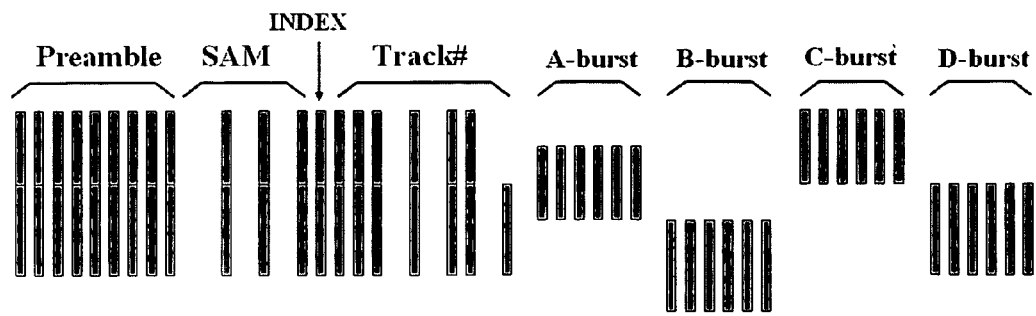

In FIG. 4(d), a B-burst has been added and the A-burst trimmed in the fourth servowriting step of the servowriter. At a point in time after the servowriting is complete, such as during normal operation of the disk drive, the upper edge of the B-burst and the lower edge of the A-burst can be used by the servo, along with the graycoded track-number whose radial center is aligned with the burst edges, to determine the R/W head position when it is in the vicinity of the center of that servo track. If a reader evenly straddles the A-burst and the B-burst, the amplitude of the signals from the two bursts will be approximately equal and the fractional Position-Error Signal (PES) derived from those bursts will be about 0. If the reader is off-center, the PES will be non-zero, indicating that the amplitude read from the A-burst is either greater than or less than the amplitude read from the B-burst, as indicated by the polarity of the PES signal. The position of the head can then be adjusted accordingly. For instance, a negative PES might indicate that the amplitude read from the A-burst is greater than the amplitude read from the B-burst. In this case, the head is too far above the center position (using the portion of the pattern in the figure) and should be moved radially downward/inward until the PES signal is approximately 0. It should be noted that for other portions of the pattern a B-burst could be above an A-burst, resulting in a smaller amplitude contribution coming from the A-burst when the head is too near the outer diameter of the disk(s).

Figure 4E:
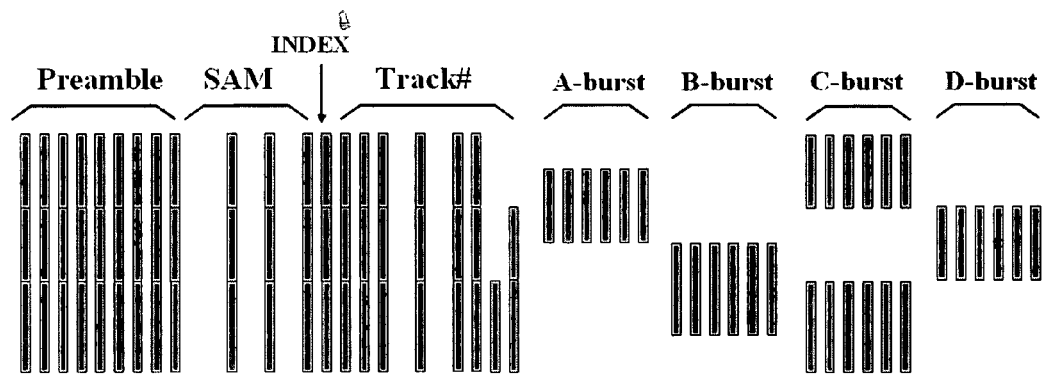
Figure 4F:
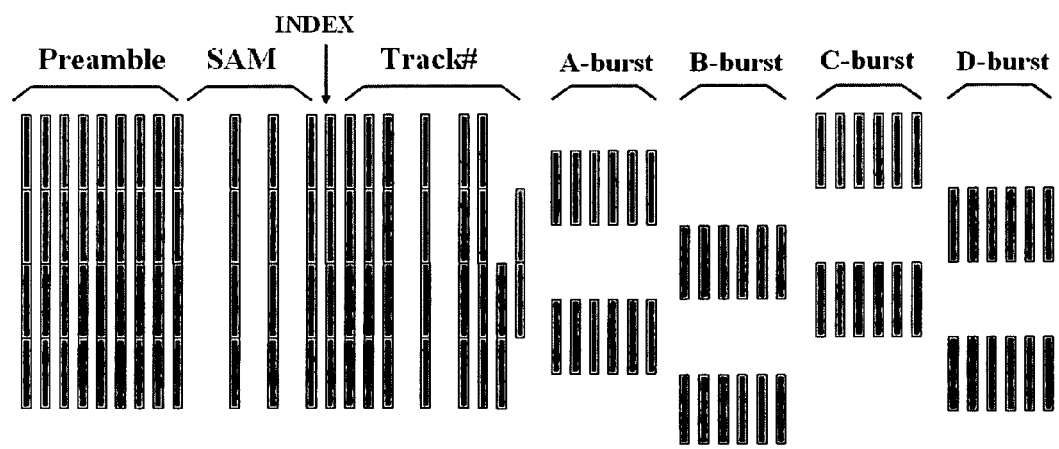

FIGS. 4(e) and 4(f) show the results of subsequent steps of the servowriting process, which has produced a number of servo tracks. After the first step in this process, each subsequent step writes one servo burst in a wedge and trims another. Every second step also writes digital information, including the SAM and track number. Between servowriting steps, the servowriting head is stepped by one-half servo track radially, either toward the inner diameter (ID) or outer diameter (OD) of the disk(s), depending on the radial direction used to write the servo information. A seek typically takes anywhere from one quarter to one half of the time it takes for the disk(s) to make one revolution. The process of writing the servo pattern for each step typically takes one or two full revolutions to write all of the wedges in that pass. It is possible that completing the burst writing and trimming for a single servowriting step can take more than two revolutions, but a maximum of two revolutions (one to write the new burst, and another to trim a previously-written burst) will be considered for the discussion below.

Using such an algorithm, servowriting can take about 1.25–2.5 revolutions per servowriting step. Since there are two servowriting steps per servo-track in this example, and 1.5 servo tracks per data-track, such a process requires 3 servowriting steps per data-track, or 3.75–7.5 revolutions per data-track. For purposes of subsequent discussion only, it will be assumed that the process takes 4 revolutions per data-track (a relatively low bound).

A disk drive can have tens of thousands of data tracks. With 100,000 data-tracks and a spin-speed of 5400 RPM (90 Hz), for example, the process would take 4,444 seconds, or about 75 minutes. If the process is carried out on an expensive servowriter, this can add substantially to the cost of the drive. Thus, drive manufacturers are motivated to use self-servowriting techniques to reduce or eliminate the time that a drive must spend on a servowriter.

One such technique uses a media-writer to write servo patterns on a stack of disks. Each disk is then placed in a separate drive containing multiple blank disks, such that the drive can use the patterned disk as a reference to re-write servo patterns on all of the other disk surfaces in the drive. The media-writer can be an expensive instrument, and it may still take a very long time to write a reference pattern on the stack of disks. However, if a stack contains 10 blank disks, for example, then the media-writer can write the reference pattern for 10 drives in the time that it would have taken to servowriter a single drive. This scheme is a member of a class of self-servowriting techniques commonly known as "replication" self-servowriting. A typical replication process, in which a drive servos on the reference pattern and writes final servo patterns on all surfaces, can take place while the drive is in a relatively inexpensive test-rack, connected to only a power-supply. The extra time that it takes is therefore usually acceptable.

Another class of self-servowriting techniques is known as "propagation" self-servowriting. Schemes in this class differ from those in the "replication" class in the fact that the wedges written by the drive at one point in the process are later used as reference wedges for other tracks. These schemes are thus "self-propagating". Typically, such schemes require a R/W head that has a large radial offset between the read and write elements, so that the drive can servo with the read element over previously-written servo wedges while the write element is writing new servo wedges. In one such application, a servowriter is used for a short time to write a small "guide" pattern on a disk that is already assembled in a drive. The drive then propagates the pattern across the disk (as described for example, in U.S. Pat. No. 6,631,046 entitled "Servo Track Writing Using Extended Copying with Head Offset"). In this type of self-servowriting operation, previously written tracks can later serve as reference tracks.

Many self-servowriting techniques require considerably more than four disk revolutions per data-track written, as the drive must spend considerable time before each servowriting step determining the written-in runout of the corresponding reference track, so that the servowriting head can be prevented from following that runout while writing the final servo pattern. Techniques exist which allow tracks of servo information to be made substantially circular, despite the fact that the reference information is not perfectly circular. The information used to remove written-in runout from the track can be calculated in one approach by examining a number of parameters over a number of revolutions. These parameters can include wedge offset reduction field (WORF) data values calculated by examining the measured PES over a number of revolutions of a track, as well as the servo loop characteristics. Some possible approaches to calculate WORF are outlined in U.S. Pat. Nos. 5,793,559 and 6,061,200. A measurement can be made to characterize servo loop characteristics, which can be combined with the observed PES in order to determine the written-in runout of the reference track. Because the servo typically suffers both synchronous and non-synchronous runout (sometimes referred to in the industry as "repeatable" runout (RRO) and "non-repeatable" runout (NRRO), respectively), any measurement intended to determine the synchronous runout can be affected by the non-synchronous runout. If many revolutions of PES data are observed and combined (one possible approach to combine is to synchronously average the PES data, another possible approach is outlined in U.S. Pat. Nos. 6,069,764, 6,437,936, 6,563,663 and 6,449,116), the effects of the non-synchronous runout can lessen, leaving substantially only synchronous runout. Observing many revolutions of PES data, however, can add significantly to the time required for determination of the written-in runout. Process engineers may need to balance the cost and benefit of additional revolutions of PES data collection in determination of WORF values.

The computed written-in runout values for each servo wedge can be written into the servo wedges themselves for later use by the servo, or can be kept in drive controller memory for immediate use. During a self-servowriting operation, the drive may use the latter option by measuring the written-in runout on a reference track and applying it to the servo by the use of a table in controller memory. Additional revolutions of PES measurements for the reference track can be used to reduce the effects of non-synchronous runout.

It has been observed that the written-in runout of a magnetically-printed media reference surface has a relatively high correlation from track to track and such correlation gradually decreases over longer radial distances. It is possible to take advantage of this local correlation in written-in runout by using, as a starting-point for one track, the WORF values that have been determined for the most-recently-servowritten track. Under this approach, the current track followed by the reference head while observing its PES values to determine its WORF-values is already very nearly circular and its observed residual PES can be used to determine an incremental change to be applied to the previously-determined WORF values.

It has also been observed that determining the low-frequency components of WORF values can be difficult, due mainly to the very high servo loop-gain of the system at low frequencies. In particular, the so called "1× WORF component" (or the component of the WORF values that varies sinusoidally at the spin-speed of the disk) can vary significantly from measurement to measurement, as small variations in the 1× component of measured PES may cause relatively large changes in the 1× component of the computed WORF values. If the determined 1× components of WORF for two adjacent tracks are significantly in error, portions of the two tracks can be "squeezed", i.e., portions of the two tracks may be closer together than desired while other portions will be too far apart (and therefore likely to be too close to their other neighbors). If all tracks of a drive have the same error in the 1× component of their WORF values, there would be an un-wanted eccentricity in the entire band of servowritten tracks, but no added track-squeeze since adjacent tracks would have similar eccentricity. Thus, one solution would be to determine the 1× component of the WORF values at one track at the beginning of the servowriting operation, and from that point on, only update higher-order components of the WORF-values (2×, 3×, 4×, etc.) as the operation proceeds from step to step. Another solution would be to have different iterative WORF update-gain for different frequencies. If a very low update-gain is used for the 1× WORF harmonic, then variations in the observed PES value on any one track will not have a large effect on the 1× WORF-values for that track. An extreme case of this strategy is to have zero update-gain for the 1× WORF component, in which case the 1× WORF-values used would be the same across the tracks of the drive. It is possible that one of the above approaches might be appropriate for more than just the 1× WORF component if the servo loop-gain at 2× or even 3× the spin-speed is also very high.

As previously described, techniques for determining and removing written-in runout of a track will hereinafter be referred to as WORF technology. If, for example, a drive spends 5 revolutions to determine the written-in runout of each reference track before writing the corresponding final wedges, that would add 15 revolutions to the writing time of each data-track (5 extra revolutions per servowriting step, times 3 servowriting steps per data-track), bringing the total time per data-track to 19 revolutions.

Even though the self-servowriting time may be as much as about five times as long as the time necessary to servowrite a drive on a servowriter (19 revolutions/data-track, versus 4 revolutions/data-track), self-servowriting is likely to be a less expensive alternative due to the expense of servowriters, as well as the fact that servowriting operations on a servowriter generally must be performed in a cleanroom environment. Also, as track-densities get higher it becomes more difficult for an external device such as an actuator push-pin to control the position of the R/W heads accurately enough to produce a servo pattern with sufficiently small written-in runout. The expense of servowriting also rises in proportion to the number of tracks on a drive.

In various embodiments of the present invention, the reference pattern can be, but is not limited to, a printed media servo pattern, or a spiral pattern. The spiral pattern is discussed in details in U.S. Pat. No. 5,668,679 entitled "System for Self-Servowriting a Disk Drive", by Paul A Swearingen, et al, filed Dec. 21, 1995. The printed media servo pattern will be utilized to illustrate the present invention in the following discussions.

Figure 5:
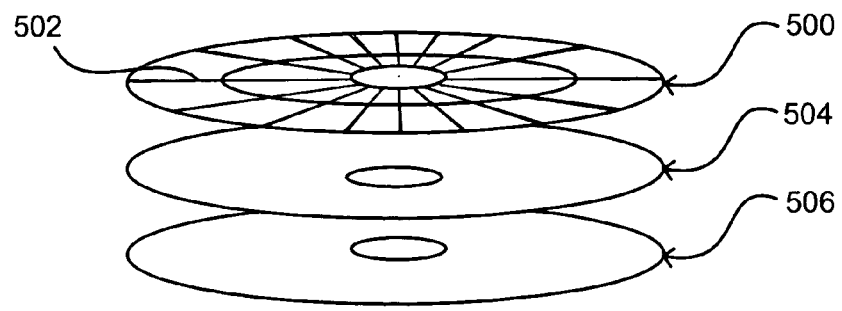
FIG. 5 is a diagram of a disk stack containing a printed reference pattern that can be used with the system of FIG. 1.

In a drive system that can be used in accordance with embodiments of the present invention, a surface of a magnetic disk 500 can contain a printed magnetic pattern 502. That magnetic disk can be placed in a drive that may contain other magnetic disks 504, 506 in a disk stack, such as the example stack shown in FIG. 5. The surface of the disk 500 having the printed magnetic pattern 502 can be used as a reference for use while writing final wedges to all disk surfaces in the drive. The printed pattern can be used as a reference for information such as timing information, circumferential position information, and/or radial position information for the disk. The use of a printed media pattern as a reference pattern can allow for a reasonable reduction in any repeatable runout written to the reference pattern by reading the printed signal pattern, perhaps over a number of revolutions at each radial location, and calculating the written-in runout. The drive system can then adjust the read/write head position to compensate for the perceived PES obtained from the reference surface in order to effectively remove the written-in runout when replicating the servo pattern. In some embodiments the runout may not be completely removed, but may be adjusted or modified to a pre-determined amount and/or pattern. Note however that it is not necessary for the printed surface to be at one end or the other of the disk-stack as shown in FIG. 5. In fact, it may be desirable to place the printed surface near to the middle of the stack in order to minimize the maximum offset between the head-radius on the reference-surface and that on other surfaces (due to, for example, tilt and other factors). The same applies to FIG. 10 discussed later.

Figure 6:
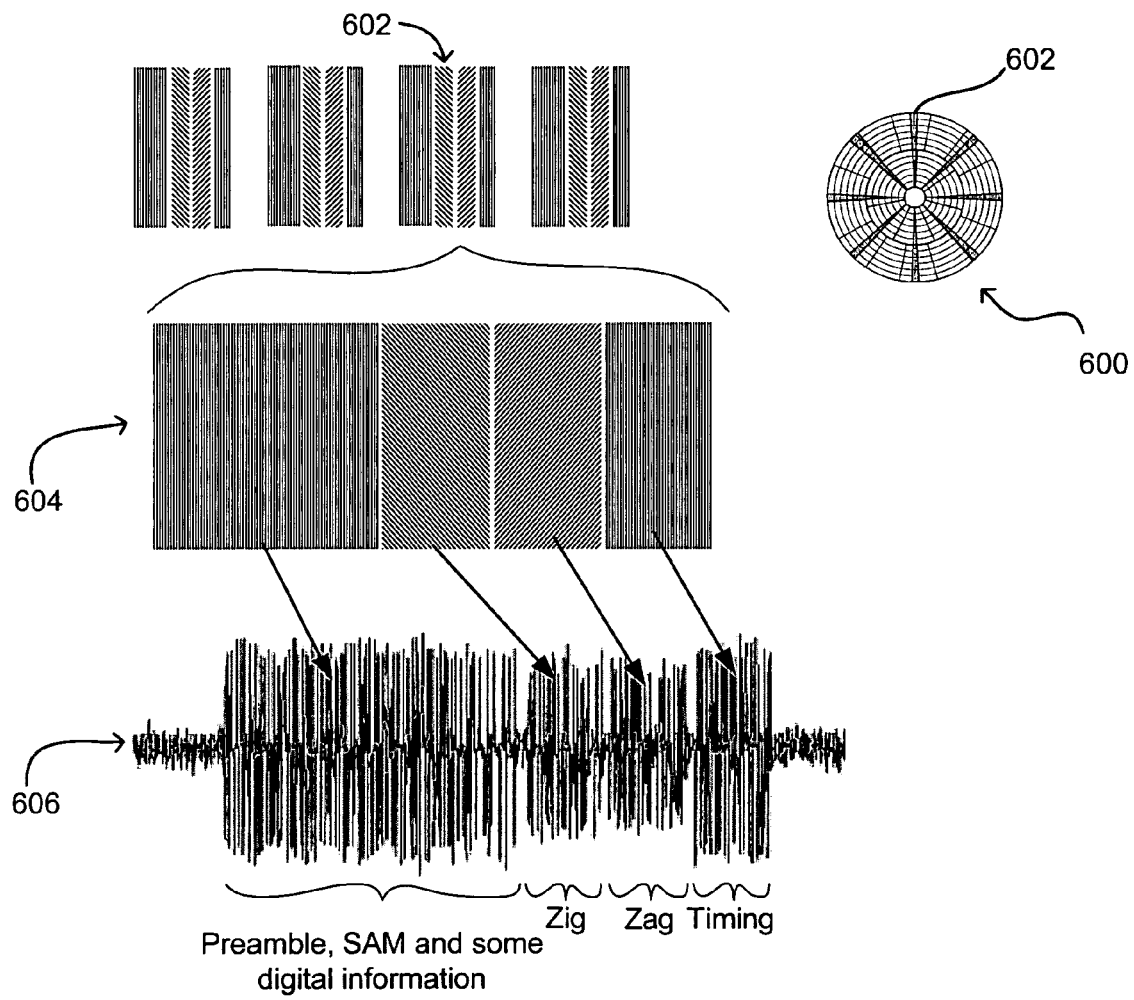
FIG. 6 is a diagram showing various views of portion of a magnetic pattern that can be used with the system of FIG. 1.

FIG. 6 shows an exemplary printed signal pattern that can be used in accordance with embodiments of the present invention, such as in the exemplary disk stack of FIG. 5. The pattern may include one or more servo wedges, and FIG. 6 shows a reference signal for servo information corresponding to a servo wedge 602 on a disk 600. The signal is shown in a variety of formats. An expanded view 604 of the exemplary magnetization pattern is shown including information for the wedge 602, followed by a signal 606 that could be generated by reading the pattern for the wedge 602. As shown in the Figure, the printed signal pattern contains a preamble, followed by a servo address mark (SAM), and digital information that may include an index-mark. Following the digital information is a pattern portion referred to as a "zig," a portion referred to as a "zag," and (an optional) timing burst.

Figure 7:
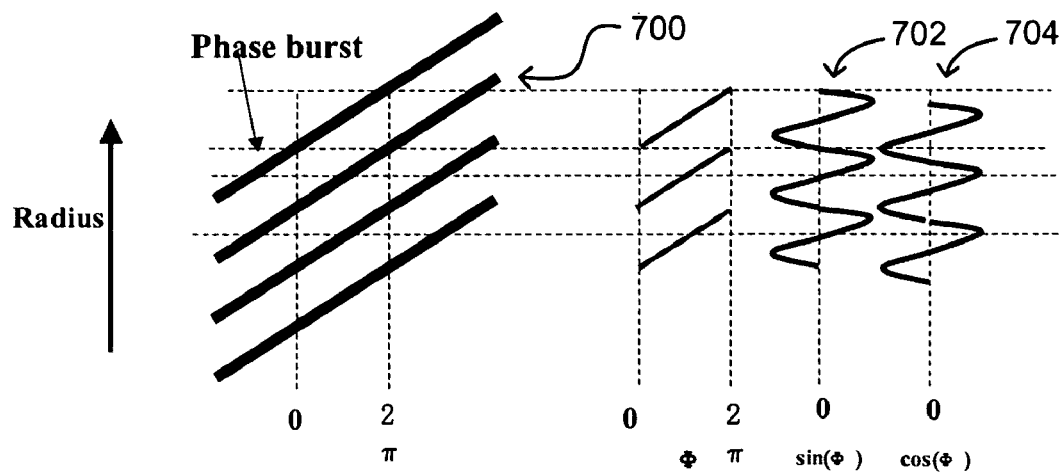
FIG. 7 is a diagram showing a phase burst and corresponding read signals that can be used with the system of FIG. 1.

FIG. 7 shows a close-up view of an exemplary "zag" phase burst 700. On a local scale, a read element may pass horizontally (in the Figure) across the burst 700. A read/write channel can read such a burst and return both a sine or "real" value 702 and a cosine or "imaginary" value 704. The phase of the burst can then be calculated as:

$$\text{Phase} = \arctan\left(\frac{\sin\phi}{\cos\phi}\right)$$

In the "zag" displayed, the magnetization pattern is slanted relative to both the radial direction (vertical in the Figure) and the circumferential direction (horizontal in the Figure). When a read element passes over the slanted burst, the time at which the element encounters the transitions in the burst can be used to determine the radial position of the element. For instance, the "higher up" the read element is in the Figure, or more toward the outer diameter (OD) of the drive, the later the phase transitions are encountered, or the more delayed the phase of the signal. The phase determination can be simplified using both a "zig" and a "zag," or regions with different or opposite slants or phases, such that the relative phase between the two can be examined, wherein the angles of the zig and zag do not have to be exactly opposite of one another. In this way, absolute phase is not an issue as the drive system can look at the relative phase of the two bursts and can get the radial position for each cycle. If the drive goes through multiple cycles, the drive can track the number of cycles encountered while traversing the disk surface from a known reference-point, as disclosed in U.S. patent application Ser. No. 10/732,638, entitled "Methods for Improving Printed Media Self-servo Writing", by Richard Ehrlich, filed Dec. 10, 2003.

Figure 12:
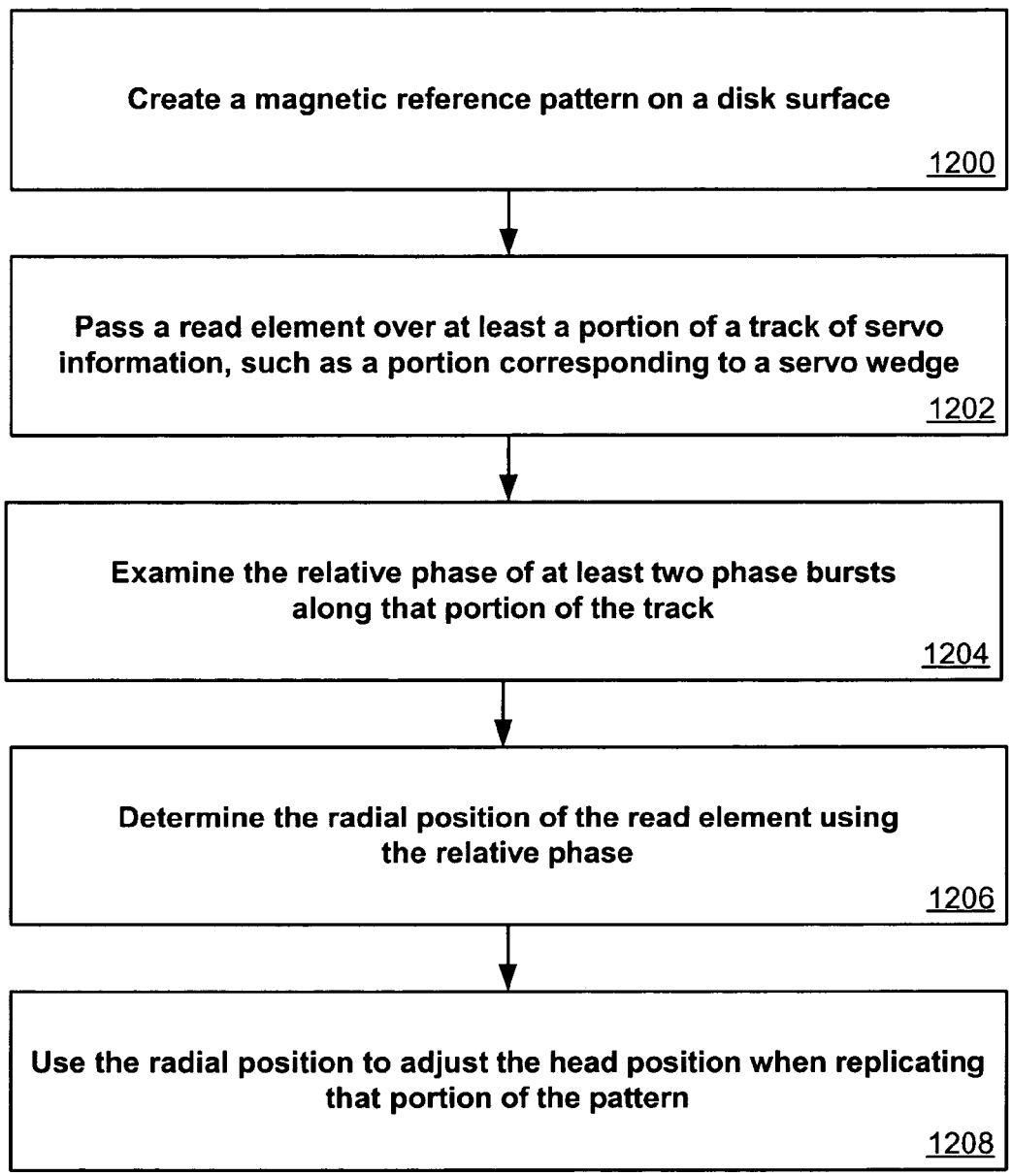
FIG. 12 is a flowchart showing a process that can be used with the system of FIG. 1.

One process utilizing the zig/zag phase bursts is shown in the diagram of FIG. 12. In such a process, a magnetic pattern is created on a disk surface, such as by printing or servowriting, which contains phase bursts for each track of servo information at step 1200. The phase bursts can include zig and zag bursts, and can be included for each or any wedge in the magnetic pattern. A read element, such as on a read/write head, can be passed over at least a portion of a track of servo information, such as a portion corresponding to a servo wedge at step 1202. The relative phase of at least two phase bursts, such as a zig and a zag for a wedge along a track, can be examined at step 1204. The radial position of the read element relative to the magnetic pattern can be determined using the relative phase at step 1206. The radial position can be used to adjust the head position(s) when replicating that portion of the pattern, either to the same surface or to any other surface in a drive or disk stack at step 1208. For instance, if the radial position of a burst for a wedge is too far towards the outer diameter of the pattern, that burst can be moved toward the inner diameter of the pattern when replicated. Several passes of the head over the pattern can be taken to reduce the error in the radial position determination.

Certain processes can be executed initially to determine the runout, as it may be desirable to remove the runout, lessen the amount of runout, or alter the runout to a desired amount. Utilizing WORF calculations is one approach that can be used to determine the amount of runout by taking into account the servo characteristics and determining how much runout was present before the servo tried to remove the runout. After the runout is measured, the amount of runout can be determined and removed.

When decoding phase bursts, a drive system can use an algorithm that takes an arc tangent of the real and imaginary parts of a discreet Fourier transform (DFT) of the burst signal. Existing channels are capable of sampling the signal and doing a discreet Fourier transform. One such discreet Fourier transform that can be used is given as follows:

$$F_k = \sum_{n=0}^{N-1} f_n e^{-j2\pi k \frac{n}{N}}$$

Figure 8:
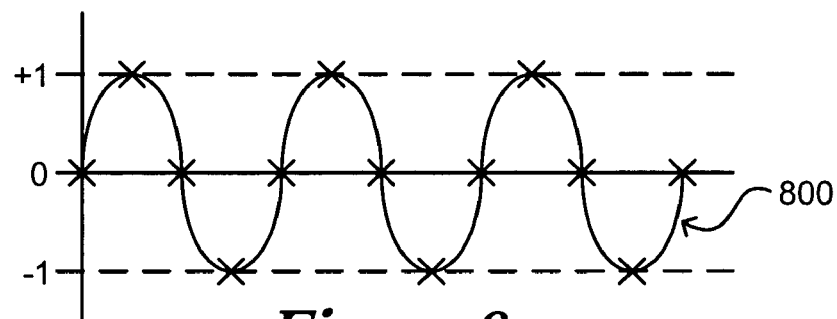
FIG. 8 is a plot showing an exemplary sampling approach that can be used with the signals of FIG. 6 and FIG. 7.

In this equation, $f_n$ is the sequence in time and $F_k$ is the Fourier component in frequency space. This "complex" math can be simplified in at least a few situations. For example, a signal can be examined at one quarter of the sample rate. The signal can also be examined at up to one half the sample rate using a Nyquist theorem-based approach. These samples can be taken at any appropriate location or interval, such as at or between signal peaks, etc. If the signal 800 is examined at one quarter the sample rate, as shown in FIG. 8 with an "x" marking each sample location, the coefficients are either +1, 0, or −1. In this case, the real part of the Fourier transform multiplies the signal by +1, 0, −1, 0, . . . and the imaginary part multiplies the signal by 0, +1, 0, −1 . . . , the imaginary part being offset by one sample from the real part. Therefore, each sample is adding to, subtracting from, or not affecting the result. An alternative approach is to use coefficients of +1, −1, −1, and +1 for the real part, and +1, +1, −1, −1 for the imaginary part, which can provide for greater immunity to noise since all samples will contribute to the sum. The discreet Fourier transform can then be reduced to an "adder" with no multiplication. A discreet Fourier transform of the signal then can be broken down into real and imaginary parts, which can each be squared and added together. The square root of this sum yields the magnitude of the signal. Alternatively, a ratio of the real and imaginary parts can be taken, and an arctangent of the ratio can yield the phase, such as using the arctan equation given above. Using the phase, the system can determine the radial position.

Note that for the above-described DFT-based burst processing to work, it is most convenient to sample the signal at a rate of four samples per cycle. Since the frequency of the printed-media signal is very low, the signal may actually be sampled much more often than four times per cycle to allow the use of the analog filtering circuitry of the channel (which is designed to deal with much higher-frequency signals). Additional DSP filtering may be required to filter the signal so that it can be re-sampled at the 4-times-per-cycle rate as described above.

In some drives, it may be necessary to erase any pre-existing "final wedges" or any signals in the final-wedge area. Such an erase procedure can be used, for example, on a "virgin" drive or for a re-scan in a self-scan process. In a virgin drive, or a drive to which no data has been written, it can be desirable to erase the final wedge area to ensure that no signal exists on the surface of the disk(s). An erase final wedge process can be run on all cylinders in a drive.

Figure 9:
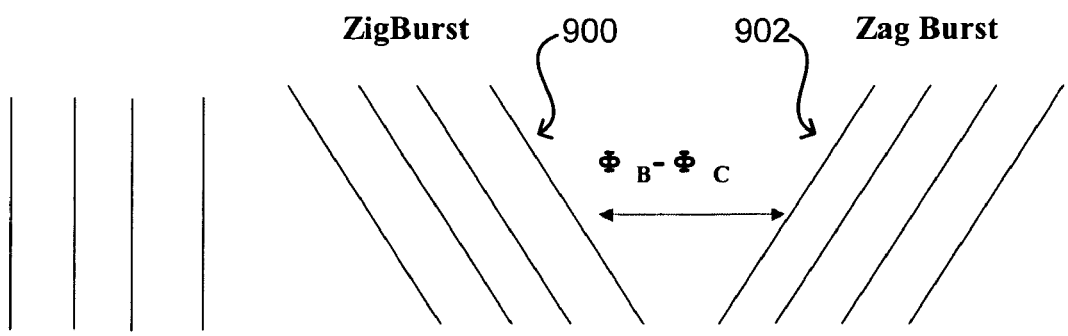
FIG. 9 is a diagram showing relative burst phases that can be used with the system of FIG. 1.

After running WORF calculations on a reference track, the measured position can be calculated. In one embodiment, as shown in FIG. 9, the phase of the "zig" burst 900 and the phase of the "zag" burst 902 can be measured. The difference between the phases can be multiplied by a number of tracks per cycle to obtain the measured radial position. For example, one way to calculate the measured position from the relative phases of the bursts can utilize a formula such as:

Measured Position=tracksPerCycle*($\Phi$zig−$\Phi$zag)

where $\Phi$zig and $\Phi$zag can be a function of the phase for the "zig" and "zag" bursts, respectively, covering both linear and non-linear uses of the burst-phase. In some embodiments, $\Phi$zig (and/or $\Phi$zag) may also be functions of the overall radial position. That is, they may vary across the stroke of the drive, according to the parameters of the printed pattern. In other embodiments, $\Phi_{zig}$ and $\Phi_{zag}$ may simply be proportional to the phases of their corresponding bursts.

A position error signal (PES) then can be calculated for each wedge. PES can be a function of the location of a read/write head or element relative to a disk surface. Once a write element is at the proper radial location, or within acceptable radial boundaries, the final wedges can be written. Wedges can be written using an approach such as a "stagger" approach or a "concurrent" approach. For example, in one such system a pre-amplifier allows concurrent writing to all heads, or some of the heads, in a drive. If the drive system does not contain such a pre-amplifier, a final wedge can be written for one head. The drive can then switch heads and write for another head, or for a group of heads. This "stagger" approach may require the drive system to know, and be able to deal with the fact, that wedges are offset in time for certain heads.

Intermediate Patterns

One limitation of existing printed media self-servowrite approaches results from the use of optical lithographic processes to create pattern masters. While such processes are generally cost effective, the minimum feature sizes can be limited. The limitations for such processes are currently around the 0.3 micron feature size, which can be much larger than the space between transitions on a final servo pattern. Therefore, optical lithographic processes are often used to print a single reference pattern instead of each final pattern. Not only is printing a single surface cheaper than printing all surfaces in a drive, but using a reference pattern for self-servowrite avoids the use in final wedges of a low-frequency pattern that does not make efficient use of the space on the disk(s). Low-frequency patterns can be noisy, and servoing on a low-frequency printed reference disk can increase the likelihood of synchronous runout. While much of this synchronous runout can be removed using WORF technology, there can also be non-synchronous runout due to disturbances such as air turbulence and noise on the position signal. PES noise on the position signal of a final wedge pattern can typically be a very small fraction of the non-synchronous runout, compared with other sources such as air turbulence spindle runout and other disturbances external to the drive.

In a printed media pattern, PES noise can be the dominant source of non-synchronous runout, which can be significantly more difficult to remove than synchronous runout, due to the low frequency of the printed media pattern. While multiple revolutions of WORF calculations can permit the determination and subsequent removal of much of the synchronous runout, the non-synchronous runout can remain. If the PES is noisy, several revolutions may be necessary to determine the synchronous runout, as the noise can contaminate the signal. The fact that there can be a lot of noise on the position error signal is itself a limitation to printed media self-servowrite. The number of wedges also can be limited in a printed pattern due to the low-frequency aspect of the pattern.

Systems and methods in accordance with various embodiments of the present invention can take care of these and other such problems, at a cost of possibly increased test time. In such a system, a printed pattern can be used to write an intermediate servo pattern instead of, or in addition to, a final servo pattern. A drive system can servo on this intermediate pattern in order to write a final pattern. Such a system can provide for at least two significant advantages. First, an intermediate pattern can be a higher frequency pattern than a printed reference pattern, which can be quite similar to the final pattern. In fact, the intermediate pattern can be essentially the same as the final pattern, except that the magnitude of the synchronous runout can be greater, due to for example the amount of non-synchronous runout on the printed pattern. When servoing on an intermediate pattern, the synchronous runout can be dealt with using WORF technology.

The intermediate pattern can have significantly less PES noise because the intermediate pattern can have a higher frequency. In fact, it is possible for the drive, while servoing on the intermediate pattern, to suffer even lower PES-noise than it does while servoing on the final pattern. This is because the intermediate pattern could utilize longer bursts than the final pattern does, because a slightly higher use of the disk-area by the intermediate pattern will not cost any additional overhead in the final pattern. Further, magnetically printed signals can have some quality issues, as the printing process does not necessarily produce sharp phase transitions.

Figure 13:
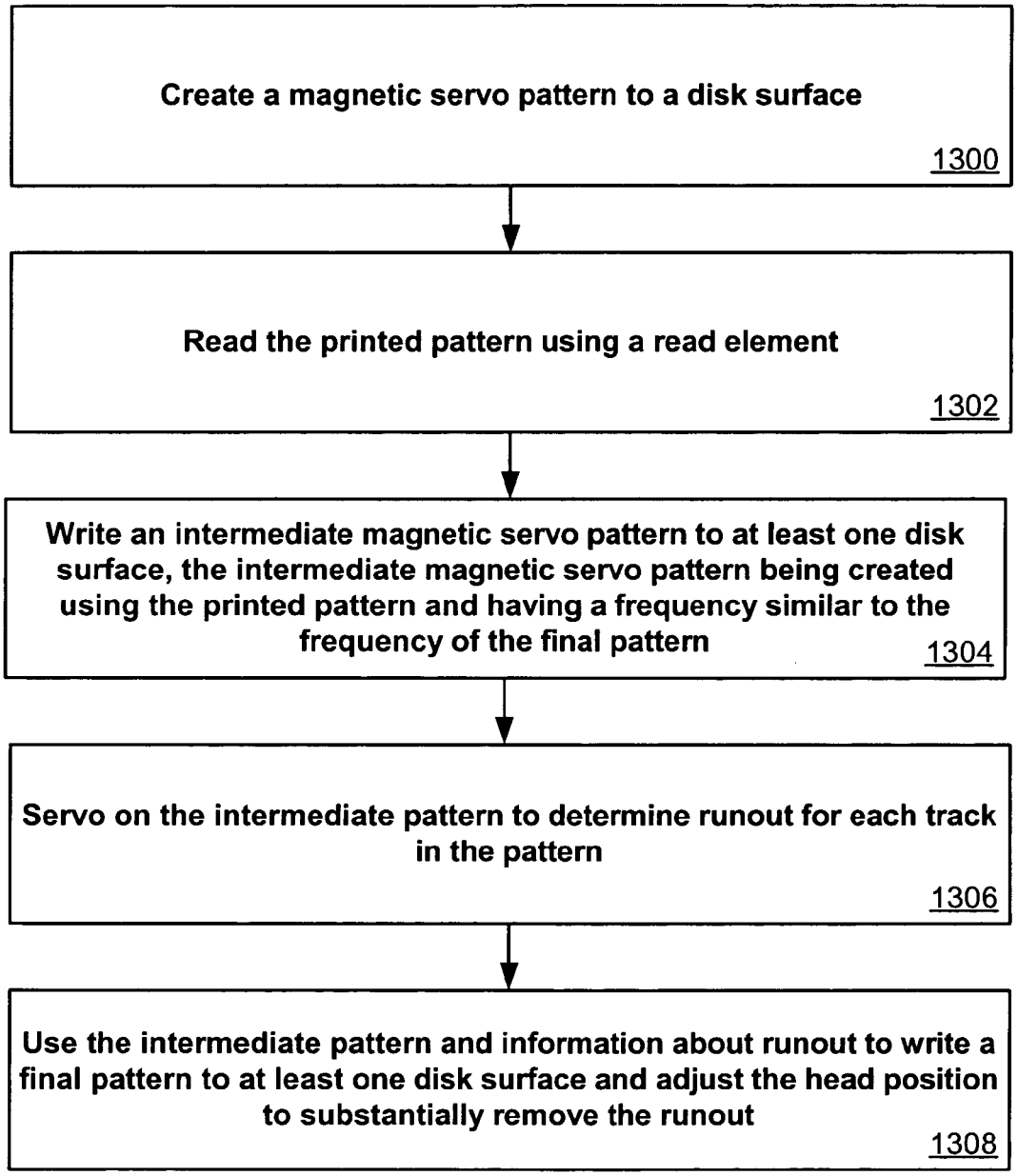
FIG. 13 is a flowchart showing a process that can be used with the system of FIG. 1.

FIG. 13 shows one such process. A magnetic servo pattern can be printed to a disk surface at step 1300. The printed pattern can be read, for example, using the read element of a read/write head at step 1302, such that an intermediate magnetic servo pattern can be written to at least one disk surface at step 1304. The intermediate pattern can be created using the printed pattern, but can have a frequency that is similar to a final pattern. The intermediate pattern can be written to the same surface as the printed pattern, the other surface of the disk, and/or to any other disk surface in a disk stack, or to more than one surface (or even to all surfaces) of the stack. The intermediate pattern can be the same as the printed pattern, essentially the same as the final pattern, or different from both. A respective read element can servo on the intermediate pattern to determine pattern runout for each track of the pattern at step 1306. The intermediate pattern and information about runout can be used to write a final pattern to at least one disk surface, with the head position being adjusted to compensate for, and/or substantially remove, the runout at step 1308.

Figure 11:
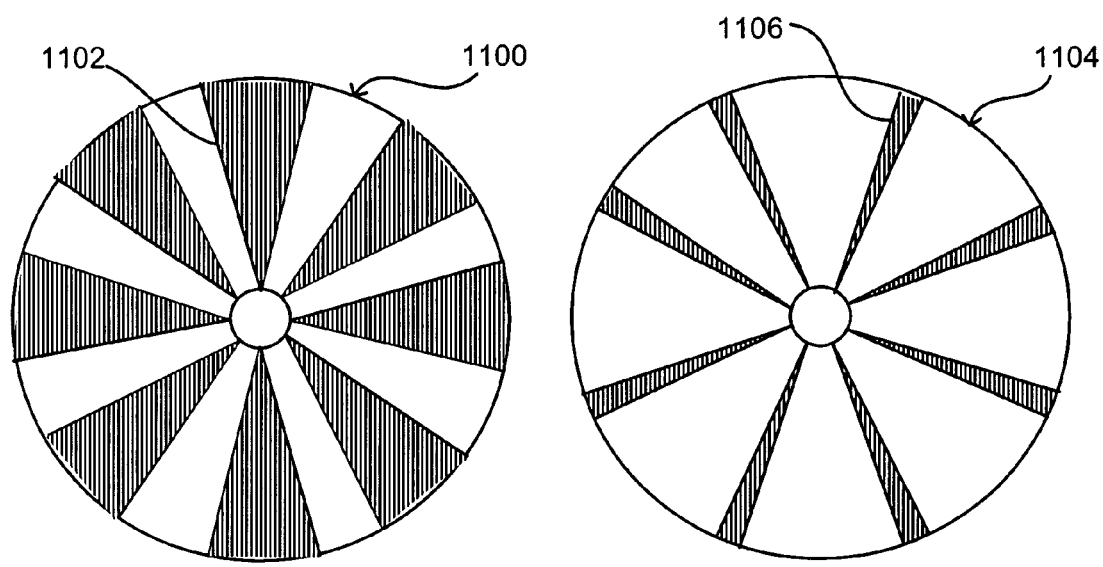
FIG. 11 is a diagram showing a printed reference pattern and intermediate pattern that can be used with the system of FIG. 1.

The use of an intermediate pattern can also allow for an increased number of wedges in a pattern. For example, a wedge in a printed pattern can occupy a certain amount of physical space on a disk surface. Intermediate wedges can be written that take up significantly less space, as they can be written with a higher resolution or at a higher frequency. If a drive designer is willing to erase, write over, or "destroy" the printed wedges, smaller wedges can be written to the disk(s) in place of the printed wedges. In one example, such as that shown in FIG. 11, an intermediate wedge 1106 can be written between printed wedges 1102 when going from a printed pattern 1100 to an intermediate pattern 1104. Each written intermediate wedge can also occupy less space than a printed wedge, such as ¼'th to ⅛'th as much space. In another example, an intermediate wedge can be written after each printed wedge. While servoing on the intermediate wedges, which can take up considerably less space than the printed wedges, the servo can write two final wedges for each intermediate wedge, creating a double-sample-rate final servo pattern. Not only can the intermediate wedges be smaller, but the wedges can also be considered to be of higher quality in a number of ways. For instance, the PES noise can be significantly lower in the intermediate wedges. The ability to servo on an intermediate pattern should be substantially similar to the ability to servo on the final pattern. Therefore, if the final drive is going to have a certain amount of runout, it should be possible to obtain about that amount of runout (or better) by servoing on the intermediate wedges when writing final wedges.

As discussed above before, self-servowriting processes used to write magnetic patterns typically fall into one of two categories: replication or propagation. In replication self-servowriting, a pattern on a reference disk is copied to other disk surfaces in a drive. In propagation self-servowriting, a drive uses a portion of a pattern already written on a disk surface to copy the pattern to other portions of the surface, and possibly to other surfaces of the drive. The use of two-step printed media self-servowrite can be advantageous primarily for replication systems.

Using intermediate patterns results in smaller PES noise, which should result in smaller non-synchronous runout during the servoing on the intermediate patterns. In addition, the amount of written-in runout (which can be or the same order of the non-synchronous runout suffered while writing) can be substantially lowered by also utilizing many of the techniques described herein, such as by taking additional passes to write servo bursts, or by varying write current while servowriting. For techniques where an accurate PES may be essential, a two-step process can provide a significant advantage. The use of intermediate wedges, whether for replication or propagation, can allow the amount of runout written into the final pattern to be on the order of or substantially less than the amount of non-synchronous runout encountered while servoing. As long as a drive has acceptable non-synchronous runout in the final product, it should be possible to self-servowrite. Other improvements to servowriting can also be used, such as improvements to reduce air turbulence and disk vibration.

Using an intermediate pattern does not mean that the amount of servowriting time is necessarily doubled. Such a system can take fewer revolutions for WORF calculations when writing the intermediate wedges, as reducing the synchronous runout of the intermediate wedges to the absolute minimum may not be necessary. Intermediate patterns can be written that provide the benefits of a higher frequency pattern without requiring as many steps as writing the final pattern. Instead of taking twice as long, it can take on the order of 50% longer to write an intermediate pattern, or on the order of about 25% longer, depending upon decisions made regarding the writing of the intermediate pattern.

Other advantages of an intermediate wedge approach can be obtained using such systems. For example, the reduction in PES noise obtained through use of an intermediate pattern can allow the use of write current variation in self-servowriting. Write current variation is described, for example, in U.S. patent application Ser. No. 10/420,076 entitled "Systems for Self-Servowriting Using Write-Current Variation," by Richard M. Ehrlich, filed Apr. 22, 2003. Without the use of intermediate patterns, the PES noise can be too great to properly determine the appropriate write current.

Timing Eccentricity

One important application of the intermediate wedge approach can be to increase flexibility in elimination of timing eccentricity. A reference pattern can have a substantial frequency variation due to factors such as a mis-centering of the pattern. As a result, the amount of time between printed pattern wedges encountered by a read element can also vary due to the mis-centering, causing a disk in a drive to exhibit so called timing eccentricity in addition to radial runout. It can be desirable to remove any timing eccentricity, as having uniform spacing (and thus equal amount of time) between wedges of a pattern can make it easier to format the drive.

Under the single-step self-servowriting approach, the final servo pattern is written directly using printed pattern without utilizing the intermediate pattern. In order to remove timing eccentricity under such approach, ample space should be reserved between the ends of mis-centered and thus non-uniformly-spaced printed pattern wedges so that there would be enough space between them to accommodate both the timing eccentricity and the final servo pattern wedges that should be uniformly spaced (and thus timed). As the result, such an approach may require the undesirable side effect of low sampling rate of the patterns.

Figure 14:
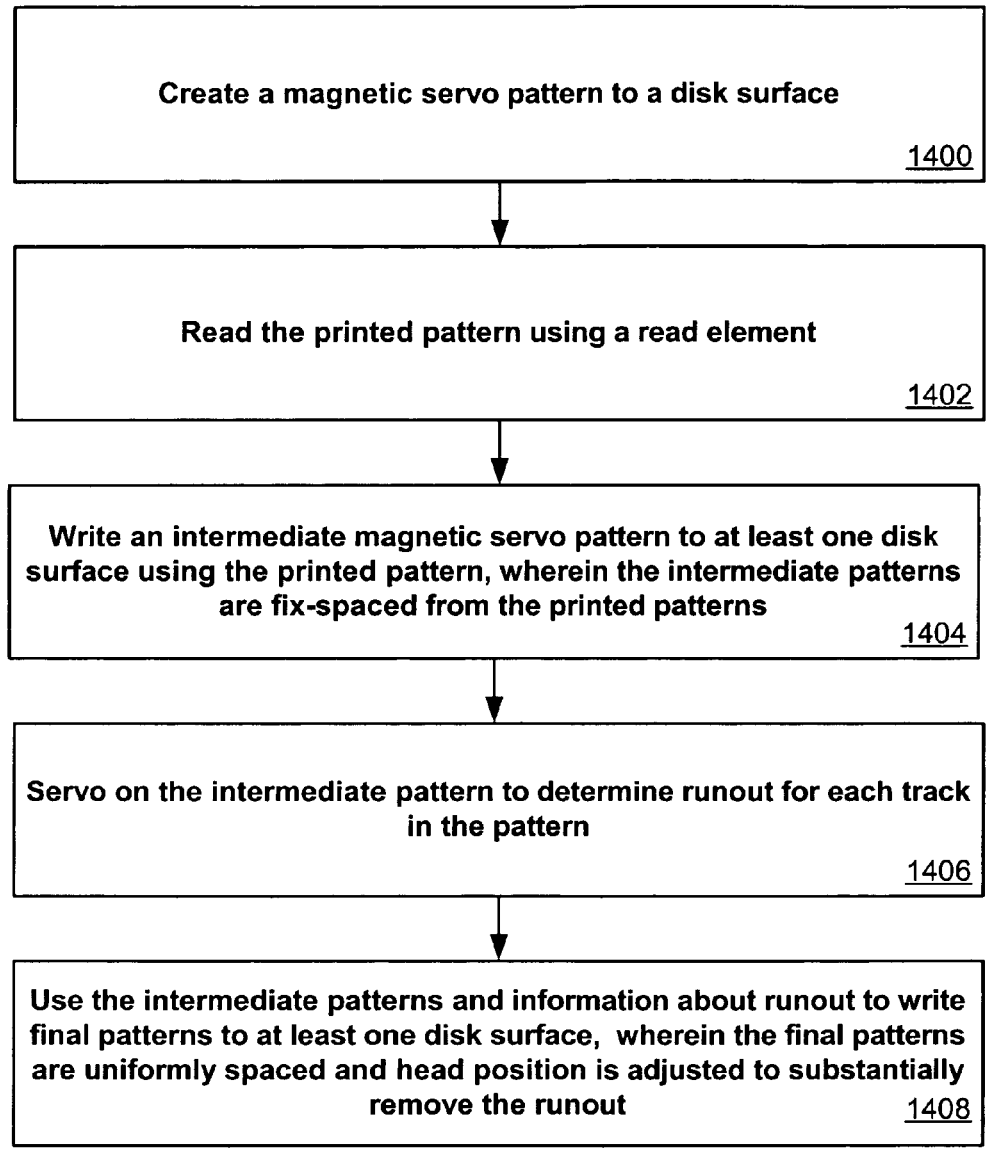
FIG. 14 is a flowchart showing a process that can be used with the system of FIG. 1.

A two-step self-servowriting approach using intermediate pattern is well-suited to solve this problem, as shown by the process in FIG. 14. Magnetic servo pattern wedges can be printed to a disk surface at step 1400, which due to the mis-centering, can be non-uniformly spaced. The printed pattern can be read by the read element of a read/write head at step 1402 and a corresponding intermediate servo pattern can be written to at least one disk surface with wedges written at a pre-determined fixed uniform spacing from the corresponding printed pattern wedges at step 1404. Here, the intermediate pattern wedges can be "fixed" relative to the printed pattern wedges, wherein the pre-determined fixed spacing can be chosen to be less than the minimum spacing between any adjacent pair of printed pattern wedges so that each intermediate pattern wedge may fall in-between a pair of printed pattern wedges. As discussed before, the intermediate pattern may eliminate the high noise caused by the low frequency of the printed pattern. Since the intermediate pattern wedges are distanced from the printed pattern wedges at a fixed uniform spacing, they may be also spaced between each other non-uniformly and may suffer from the same timing eccentricity problem suffered by the printed pattern. However, such non-uniformly spaced intermediate pattern wedges may actually help to improve the sampling rate of the printed pattern since printed pattern wedges no longer need to be spaced wide apart to accommodate uniformly spaced final pattern wedges between them (at same or even higher frequencies). As discussed before, a respective read element of a read/write head can servo on the intermediate pattern to determine the pattern runout for each track of the pattern at step 1406. The intermediate pattern and the information about runout can then be used to write wedges final pattern at the same or higher sample rate to at least one disk surface at a uniform spacing at step 1408. The head position can be adjusted to compensate for, and/or substantially remove the runout and wedge-write timing can be adjusted to compensate for and/or substantially remove the timing eccentricity suffered by both the printed and intermediate patterns. Here, uniform spacing of final pattern wedges is possible without sacrificing the sampling rate since 1) Both intermediate pattern and final pattern are much smaller in size than the printed pattern, leaving ample space between intermediate pattern wedges to accommodate the writing of the space-efficient final pattern wedges; 2) The final pattern wedges can be written in place of the printed pattern wedges if so desired, making the writing of the final pattern less restrictive.

Per Head and Per Cylinder Processes

Figure 10:
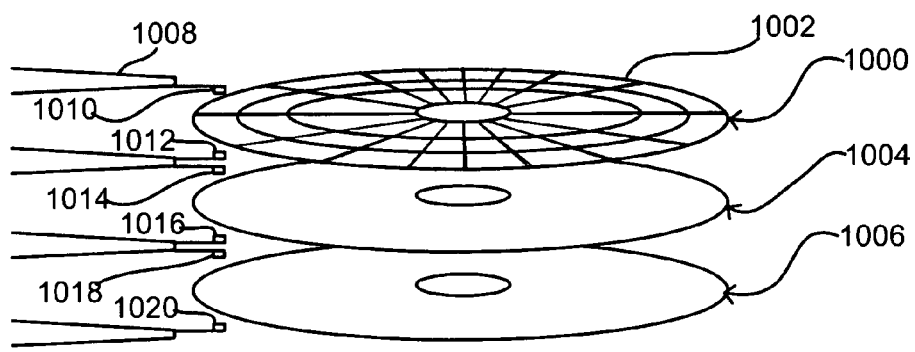
FIG. 10 is a diagram showing a reference pattern in a disk stack that can be used in the system of FIG. 1.

In some embodiments, a disk drive such as that shown in FIG. 1 can contain multiple disks 1000, 1004, 1006 in a disk stack as shown in FIG. 10. Each surface of each disk can be capable of storing a magnetic pattern 1002 written thereon by a respective write head 1010, 1012, 1014, 1016, 1018, 1020. A write head, or read/write head, can be brought into proximity with the respective disk by an actuator arm 1008. For actuator arms between disks, an actuator arm can have two suspension sections each having a read head, with one suspension section for each disk. Two separate actuator arms also can be used, each having a read element for the respective disk surface.

In some embodiments, a drive as shown in FIG. 10 can perform two-step self servowriting using a per-head self-servowriting process to further improve written-in runout. In such a process, intermediate servo patterns can be written via each head in the drive, and the final servo patterns can be written and/or re-written for each head independently of each other based on the process discussed below. Since servoing on each head can allow the removal of much of the spindle tilt, actuator tilt effects, and disk vibration, the per-head process allows for a removal of the non-repeatable runout for each head, which can greatly reduce the amount of written-in runout. Using such a per-head process can reduce the individual runout of head caused by disk vibrations at the possible expense of being a little less time-efficient.

Figure 15:
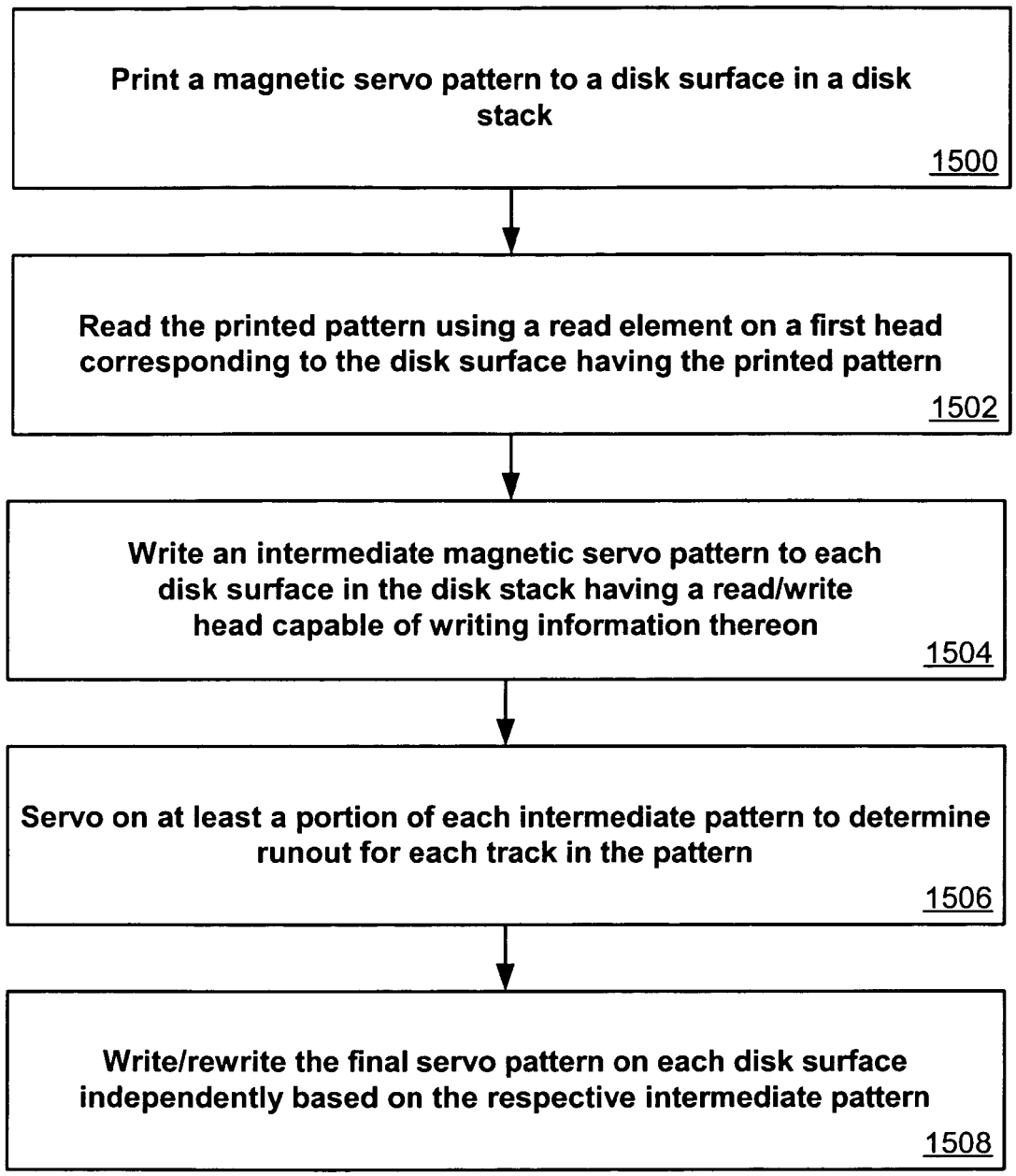
FIG. 15 is a flowchart showing a process that can be used with the system of FIG. 1.

An exemplary per-head two-step self-servowriting process is shown in the flowchart of FIG. 15. In the process, a magnetic servo pattern is printed to a disk surface in a disk stack at step 1500, wherein the printed media servo pattern can contain servo bursts for each concentric track in the pattern. The printed servo pattern can then be read using a read element on a read/write head that corresponds to the disk surface having the printed pattern at step 1502. An intermediate magnetic servo pattern can be written to each additional surface in the disk stack that has a respective read/write head capable of writing information on that surface at step 1504. Each head can then servo on at least a portion of the respective intermediate pattern in order to determine runout for tracks in the pattern at step 1506. Based on the respective intermediate pattern, each head can then proceed to write and/or rewrite the final servo pattern on its respective disk surface independently of each other at step 1508.

In other embodiments, self-servowriting can utilize a per-cylinder instead of a per-head approach as described below. The term cylinder is used herein as referred to the disk drive containing multiple rotatable disks and corresponding read/write heads in a disk stack. Servo information read from one disk surface by one head in a cylinder can be used to write servo pattern(s) to each other disk surface in the cylinder. When a two-step printed media process is used, all heads in a drive can be used to write intermediate patterns. The drive then can select the reference head from amongst all the heads in the drive to servo on the corresponding intermediate pattern for the writing of final patterns on each disk in the drive. Since the ability of a drive to servo on an intermediate pattern via a reference head can affect the quality of each final servo pattern, the drive may select a preferred or "optimal" head as the reference head, instead of selecting a reference head without examination. In order to determine the optimal head to use as the reference head, the system can look at the non-repeatable runout while servoing on each head at a couple of spots across the stroke, and decide which head shows the lowest average amount of non-synchronous runout, or demonstrates the best servo characteristics.

Figure 16:
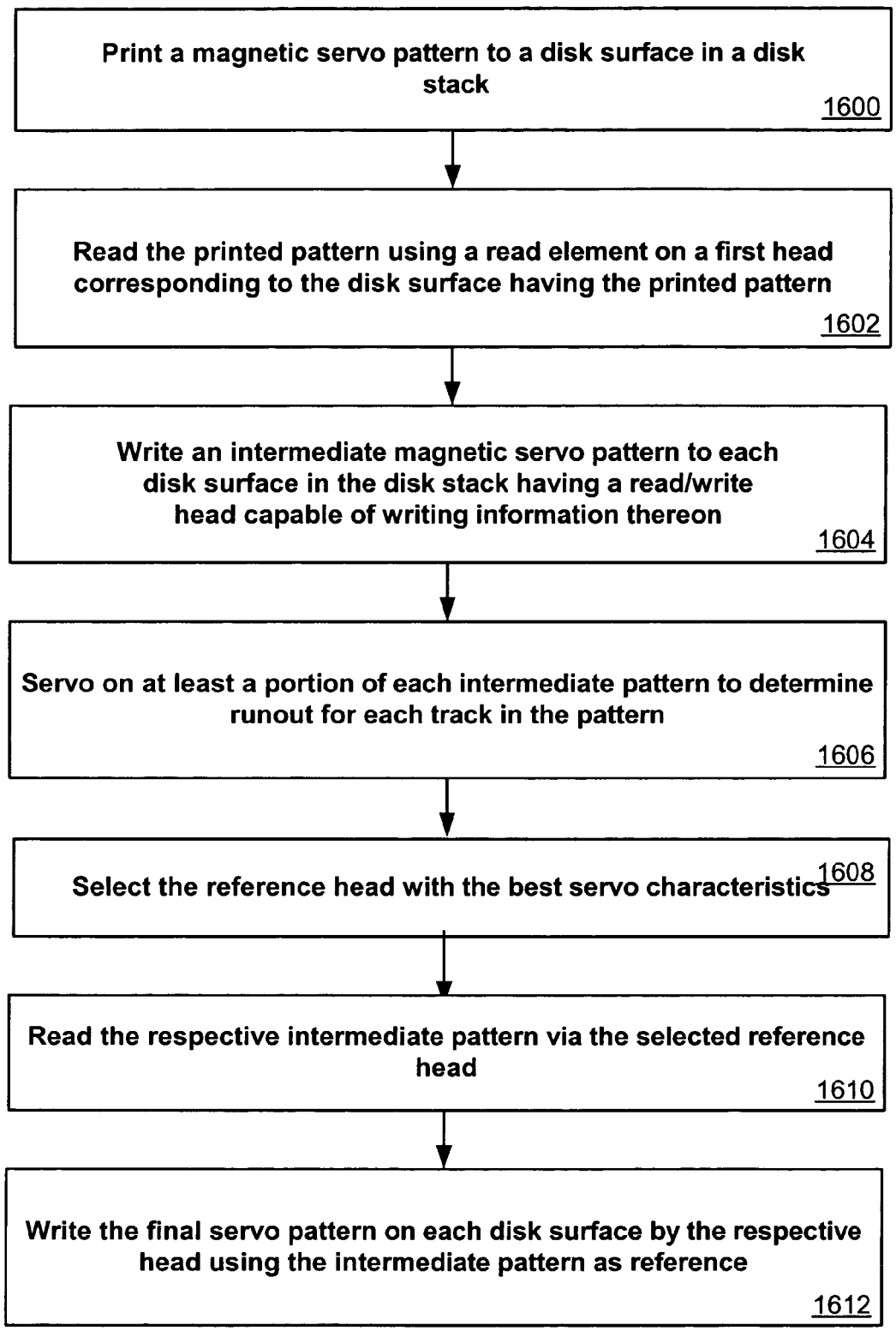
FIG. 16 is a flowchart showing a process that can be used with the system of FIG. 1.

An exemplary per-cylinder two-step self-servowriting process is shown in the flowchart of FIG. 16. Steps 1600–1606 in the process can be identical to the steps 1500–1506 in the per-head process described above. At step 1608, a reference head can be selected that shows the lowest average amount of non-synchronous runout, or demonstrates the best servo characteristics. The selected reference head can then be used to read the respective intermediate pattern at step 1610. Such intermediate pattern, combined with the runout information, may act as a reference pattern for the writing of the final servo pattern on each disk surface by the respective read/write head at step 1612.

In certain situations, a per-cylinder process can be more time efficient than the per-head process. A per-cylinder approach allows a pattern to be replicated to each other disk in the drive one cylinder all at a time. It can also allow the final patterns in the cylinder to be examined and re-written as necessary, or can allow the selected reference head to be switched if another head corresponding to an alternative intermediate pattern becomes preferable. In addition, a per-cylinder approach can minimize the number of movements of an actuator arms assembly when servowriting, thereby decreasing the opportunity for mechanical adjustment error and/or hysteresis.

MR Bias

Since PES noise on the printed surface can be a significant problem, it can be desirable to use the highest safe MR bias, or the highest allowable amount of current that goes through a magneto-resistive (MR) sensor on an MR head. Increasing the MR bias can improve the ability of a read element to properly detect and read servo information, as the signal strength can be increased. Similar advantages can be obtained when using an increased MR bias while writing servo information. Systems can use the highest reasonable MR bias on the reference head while servoing on the printed media surface. This can be undesirable however, as higher MR biases can have a greater probability of causing a head failure. The failure of a head can be due to, for instance, electro-migration. Head failure can also result from high temperatures, as maintaining an MR stripe at a high temperature for a significant period of time can degrade performance. The tradeoff between higher probability of head failure and higher PES noise can lead to an intermediate MR bias applied to a head. In some embodiments, a higher MR bias can be applied during the self-servowrite process since the process can take on the order of only a few hours. Further, less time is spent writing the intermediate wedges in a two-step process, such that it can be acceptable to use a slightly higher MR bias during that time. Various methods can be used in accordance with other embodiments in order to prolong the life of an MR head, such as switching heads while the drive is idling, or turning off the MR bias between wedges when not reading data.

Although embodiments described herein refer generally to systems having a read/write head that can be used to write bursts on rotatable medium (magnetic media), similar advantages can be obtained with other such data storage systems or devices. For example, a laser writing information to an optical media can take advantage of additional passes when writing position information. Any media, or at least any rotatable media in a single and/or multi-headed disk drive, upon which information is written, placed, or stored, may be able to take advantage of embodiments of the present invention.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method for two-step self-servowriting, comprising:
generating a reference pattern on a surface of one or more rotatable disks in a disk stack;
positioning a plurality of read/write heads relative to the surfaces of the one or more rotatable disks;
reading the reference pattern via the read/write head corresponding to the surface of the disk containing the reference pattern;
writing an intermediate pattern on each surface of the one or more rotatable disks via the plurality of read/write heads;
selecting an intermediate pattern based on one or more criteria;
reading the intermediate pattern via the respective read/write head; and
writing a final servo pattern on each surface of the one or more rotatable disks via the plurality of read/write heads using the selected intermediate pattern as reference.

2. The method according to claim 1, wherein:
the reference pattern can be a printed media pattern or a spiral pattern.

3. The method according to claim 1, wherein:
the writing of the intermediate, and final servo patterns can utilize a read/write head in plurality of read/write heads, wherein the read/write head comprises of a read element operable to read the patterns and a write element operable to write the intermediate and/or the final pattern.

4. The method according to claim 1, wherein:
each of the one or more criteria for selecting the intermediate pattern can be one of:
the most regular intermediate pattern;
the intermediate pattern showing the best amount of synchronous runout;
the intermediate pattern showing the best amount of non-synchronous runout, and
the intermediate pattern demonstrating the best servo characteristics.

5. The method according to claim 1, further comprising:
writing and/or rewriting the final servo pattern on the one or more rotatable disks all at one time.

6. The method according to claim 1, further comprising:
examining the final servo pattern on each of the one or more rotatable disks;
selecting an alternative intermediate pattern;
reading the intermediate pattern via the respective read/write head; and
erasing the current final servo pattern and writing a new final servo pattern on the surface of each of the one or more rotatable disks via the plurality of read/write heads using the intermediate pattern as reference.

7. The method according to claim 1, further comprising:
servoing on at least a portion of each intermediate pattern to determine the runout caused by the vibration of the respective disk in the one or more rotatable disks; and
reducing such runout when writing and/or rewriting the final servo pattern based on the intermediate pattern.

8. The method according to claim 1, further comprising:
erasing the reference pattern once the intermediate pattern on the surface of each of the one or more rotatable disks has been written.

9. The method according to claim 1, further comprising:
writing and/or rewriting a final servo pattern in place of the reference pattern on the corresponding surface of the disk in the one or more rotatable disks.

10. The method according to claim 1, further comprising:
erasing each intermediate pattern once each final servo pattern on the surface of each of the one or more rotatable disks has been written.

11. A system for two-step self-servowriting, comprising:
one or more rotatable disks in a disk stack, wherein each surface of the one or more rotatable disks is operable to contain one or more patterns including at least one of a reference pattern, an intermediate pattern and a final pattern;
a plurality of read/write heads, wherein each of the plurality of read/write heads includes:
  a read element operable to read the one or more patterns; and
  a write element operable to write the intermediate and/or the final pattern; and
one or more controllers operable to:
  position the plurality of read/write heads relative to the surfaces of the one or more rotatable disks;
  read the reference pattern via a read/write head corresponding to the surface of the disk containing the reference pattern;
  write an intermediate pattern on each surface of the one or more rotatable disks via the plurality of read/write heads;
  select an intermediate pattern based on one or more criteria;
  read the intermediate pattern via the respective read/write head; and
  write a final servo pattern on each surface of the one or more rotatable disks via the plurality of read/write heads using the selected intermediate pattern as reference.

12. The system according to claim 11, wherein:
each of the one or more rotatable disks can be a magnetic disk, an optical disk, laser-recordable disk, or a rotatable data storage device.

13. The system according to claim 11, wherein:
each of the one or more patterns can include one or more wedges, wherein each of the one or more wedges can include digital information and one or more bursts.

14. The system according to claim 11, wherein:
each of the one or more criteria for selecting the intermediate pattern can be one of:
  the most regular intermediate pattern;
  the intermediate pattern showing the best amount of runout; and
  the intermediate pattern demonstrating the best servo characteristics.

15. The system according to claim 11, wherein:
the one or more controllers are further operable to write and/or rewrite the final servo pattern on each of the one or more rotatable disks all at one time.

16. The system according to claim 11, wherein:
the one or more controllers are further operable to:
  examine the final servo pattern on each of the one or more rotatable disks;
  select an alternative intermediate pattern;
  read the intermediate pattern via the respective read/write head; and
  erase the current final servo pattern and write a new final servo pattern on a surface of each of the one or more rotatable disks via the plurality of read/write heads using the intermediate pattern as reference.

17. The system according to claim 11, wherein:
the one or more controllers are further operable to:
  servo on at least a portion of each intermediate pattern to determine the runout caused by the vibration of the respective disk in the one or more rotatable disks; and
  reduce such runout when writing and/or rewriting the final servo pattern based on the intermediate pattern.

18. The system according to claim 11, wherein:
the one or more controllers are further operable to erase the reference pattern once each intermediate pattern on the surface of each of the one or more rotatable disks has been written.

19. The system according to claim 11, wherein:
the one or more controllers are further operable to write and/or rewrite a final servo pattern in place of the reference pattern on the corresponding surface of the disk in the one or more rotatable disks.

20. The system according to claim 11, wherein:
the one or more controllers are further operable to erase each intermediate pattern once each final servo pattern on the surface of each of the one or more rotatable disks has been written.

21. A system for two-step self-servowriting, comprising:
means for generating a reference pattern on one surface of a one or more rotatable disks in a disk stack;
means for positioning a plurality of read/write heads relative to the surfaces of the one or more rotatable disks;
means for reading the reference pattern via the read/write head corresponding to the surface of the disk containing the reference pattern;
means for writing an intermediate pattern on each surface of the one or more rotatable disks via the plurality of read/write heads;
means for selecting an intermediate pattern based on one or more criteria;
means for reading the intermediate pattern via the respective read/write head; and
means for writing a final servo pattern on each surface of the one or more rotatable disks via the plurality of read/write heads using the selected intermediate pattern as reference.

* * * * *